Figure 1:
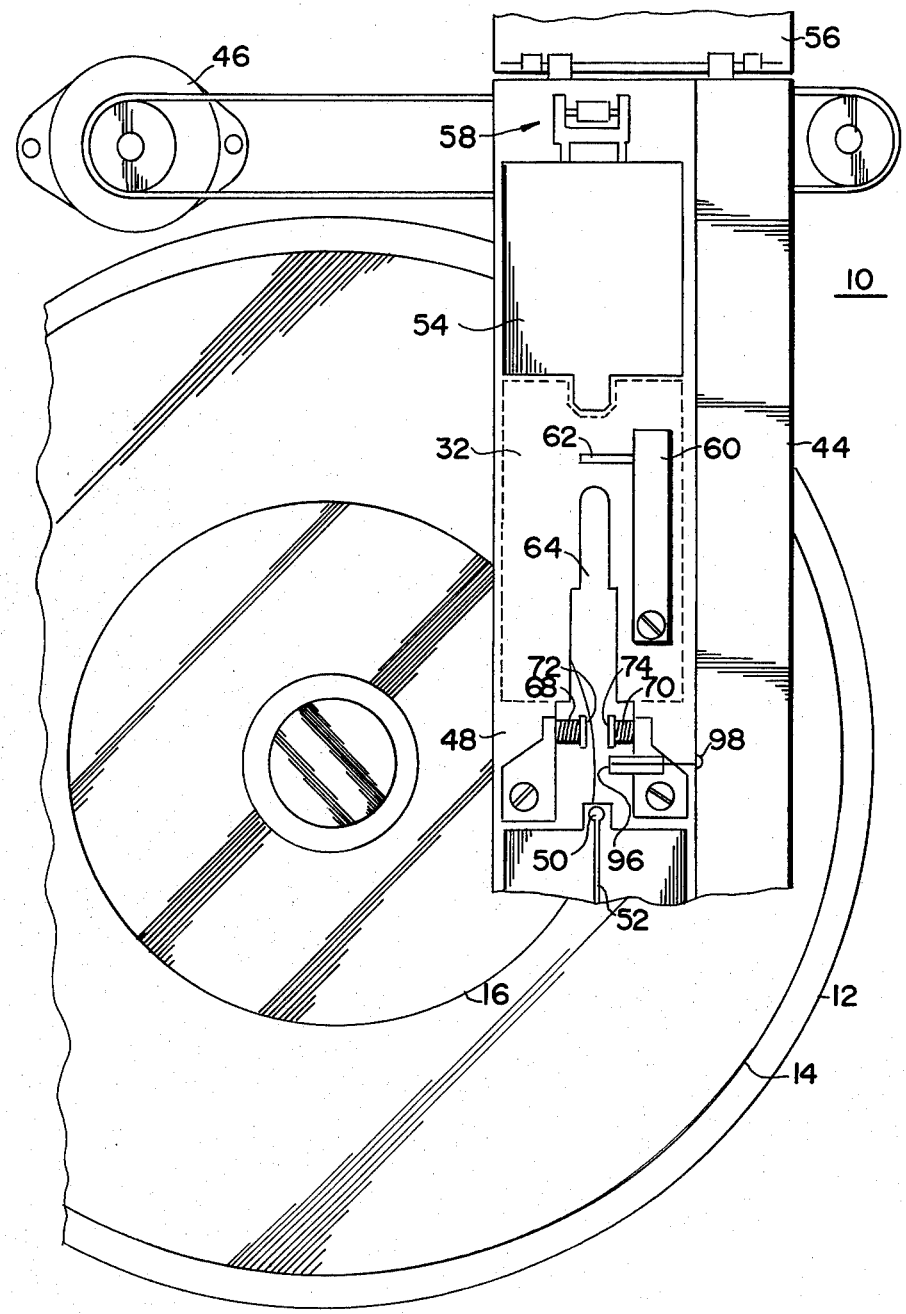

United States Patent [19]

Taylor

[11] 4,382,292
[45] May 3, 1983

[54] VIDEO DISC PLAYER HAVING STYLUS POSITION SENSING APPARATUS

[75] Inventor: Byron K. Taylor, Indianapolis, Ind.

[73] Assignee: RCA Corporation, New York, N.Y.

[21] Appl. No.: 251,571

[22] Filed: Apr. 6, 1981

Related U.S. Application Data

[63] Continuation of Ser. No. 55,648, Jul. 9, 1979, abandoned.

[51] Int. Cl.³ ............................................. G11B 3/38
[52] U.S. Cl. ...................................... 369/43; 369/61; 369/126; 369/219
[58] Field of Search ................. 360/70, 77; 369/43, 369/61, 126, 170, 244, 256

[56] References Cited

U.S. PATENT DOCUMENTS

| | | | |
|---|---|---|---|
| 3,963,861 | 6/1976 | Crooks | 369/43 |
| 3,963,864 | 6/1976 | Fuhrer | 369/43 |
| 4,030,124 | 6/1977 | Allen | 369/43 |
| 4,163,994 | 8/1979 | Sakamoto et al. | 360/70 |
| 4,258,233 | 3/1981 | Simshauser | 369/43 X |
| 4,280,023 | 7/1981 | Christopher | 369/61 X |

*Primary Examiner*—Aristotelis M. Psitos
*Attorney, Agent, or Firm*—E. M. Whitacre; J. S. Tripoli; D. A. Kulkarni

[57] ABSTRACT

In a video disc player, a stylus arm, having a track-following stylus at one end thereof, has its other end secured to a pickup cartridge by means of a compliant member. A conductive flylead disposed in the cartridge provides an electrical connection between an electrode incorporated in the stylus and a terminal disposed in the cartridge. The pickup cartridge is removably received in an arm carriage which is translated along a path disposed radially of the disc record during playback. Reception of the cartridge on the carriage establishes an electrical contact between the cartridge terminal and signal pickup circuits in the player. The pickup circuits additionally serve to sense a stylus position representative capacitance formed between the flylead and a second electrode mounted on the cartridge adjacent thereto.

2 Claims, 10 Drawing Figures

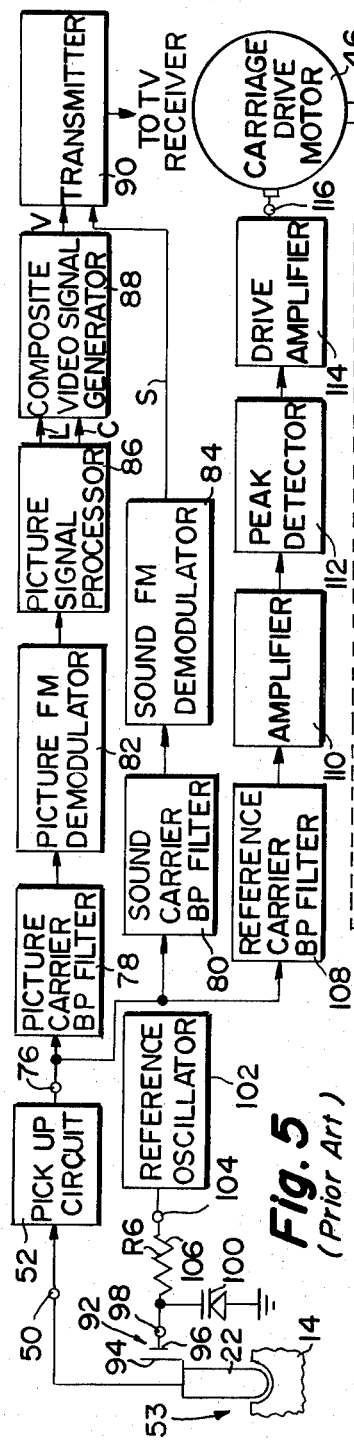
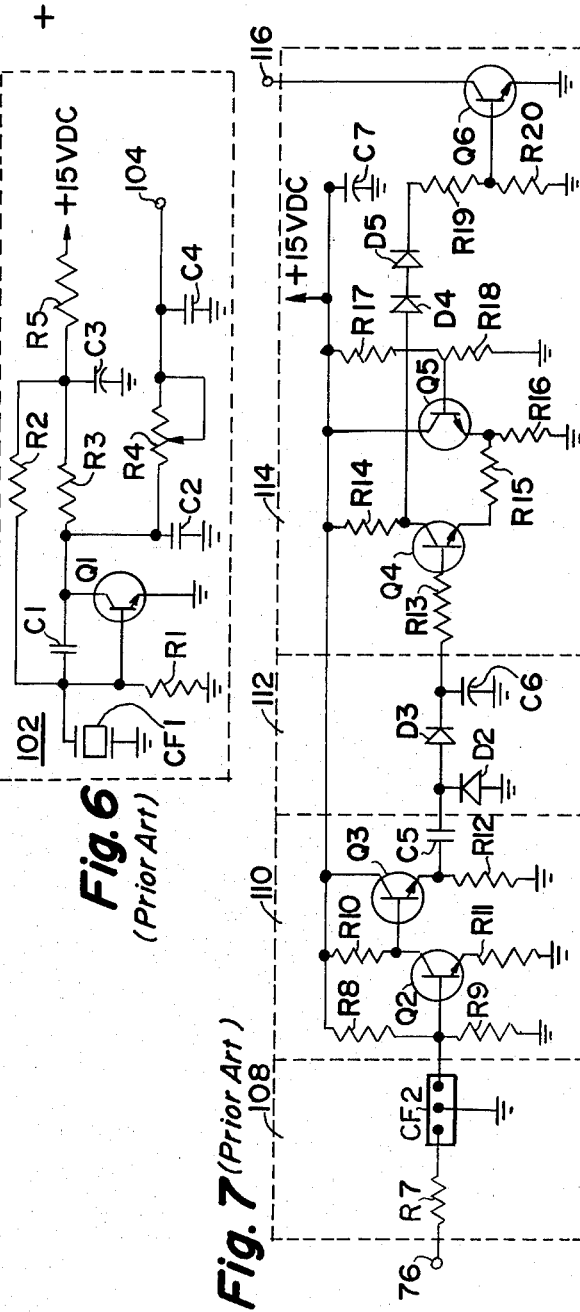
Fig. 5 (Prior Art)
Fig. 6 (Prior Art)
Fig. 7 (Prior Art)

VIDEO DISC PLAYER HAVING STYLUS POSITION SENSING APPARATUS

This is a continuation of application Ser. No. 055,648, filed July 9, 1979 now abandoned.

This invention relates to an apparatus for sensing the relative position of a track-following stylus with respect to an independently-driven arm carriage suitable for use in a video disc player.

In a certain high density information record system, signals are recorded in the form of geometric variations in the bottom of a smooth spiral groove disposed on a disc record, the surface of which comprises conductive material covered with a thin coating of dielectric material. The record player includes a stylus arm carrying a groove-engaging stylus at its free end, and having its other end secured by means of a compliant coupler to an arm carriage. A turntable is provided for rotatably supporting the record during playback. The arm carriage is subject to translation, independent of the lateral motion of the groove-engaging stylus, along a path disposed radially of the disc record during playback. Pickup circuits are employed for sensing the variations in the signal representative capacitance established between an electrode incorporated in the pickup stylus and the record conductive material as the record is rotated to recover prerecorded signals. U.S. Pat. No. 3,842,194, issued to Clemens describes a capacitance pickup system of the abovementioned type.

In a high density information record system, it is desirable to house the stylus assembly in a protective cartridge of the type described in U.S. Pat. No. 4,030,124 (Allen). In the arrangement described in the Allen application, the stylus arm has its other end secured to the cartridge housing by a compliant coupler. A conductive leaf spring is interposed between the stylus electrode and a terminal disposed on the cartridge. The pickup cartridge is subject to reception in a compartment provided in the translatable arm carriage. An electrical contact is established between the cartridge terminal and the pickup circuits during containment of the cartridge in the carriage compartment. The stylus leaf spring is described in more detail in U.S. Pat. No. 4,077,050 (Dholakia).

In the playback of disc records having high groove densities (e.g., of the order of 9,000 to 10,000 groove convolutions per inch), conditions are occasionally encountered when the presence of some form of discontinuity in the disc groove causes the pickup stylus to skip across groove convolutions rather than follow the successive convolutions of the spiral groove in a continuous progression. Depending on the nature of a defect, an encounter of the stylus with the defect may result in an inward deflection of the pickup stylus (i.e., forward skip) or an outward deflection thereof (i.e., backward skip). In some instances, the outward deflection of the stylus is repeated a number of times causing the stylus to retrace one or more previously traversed convolutions, and thereby producing repeat play with annoying effects on picture display and sound reproduction. Such a repeat traversal of groove convolutions is referred to hereinafter as a "locked groove" occurrence.

In systems of the foregoing type, it is desirable to make a provision for correction of the locked groove problems, for example, by causing inward displacement of the pickup stylus upon occurrence of a locked groove to relocate the stylus to a point along the continuation of the spiral groove beyond the particular defect causing backward groove skips.

The apparatus used for relocating the stylus from one groove convolution to another, in addition to its use for the locked groove correction function, is also suitable for providing such features as fast/slow forward motion, fast/slow reverse motion, repeat play and search. U.S. patent application, Ser. No. 039358, filed on May 15, 1979 in the name of Simshauser describes an illustrative track skipper apparatus.

Effective operation of the track skipping systems of the type described above requires that a fixed spatial relationship be maintained between the pickup stylus and the arm carriage. To this end, a system for sensing the relative position of the stylus with respect to the arm carriage is described in a concurrently-filed, copending U.S. patent application, Ser. No. 055,976, of Christopher, entitled "STYLUS POSITION SENSING APPARATUS FOR VIDEO DISC PLAYER", and assigned to the assignee of the instant invention. The system disclosed in the Christopher application includes a pickup stylus position indicative capacitance formed between a first electrode secured to the stylus and a second electrode mounted to the carriage near the first electrode. The player signal pickup circuits also serve to sense the variations in the stylus position indicative capacitance to provide a signal representative of the stylus relative position. In accordance with a further feature of the Christopher invention, the rate of translation of the carriage is varied in response to the stylus position representative signal in a manner that maintains an advantageous spatial relationship between the stylus arm and the carriage. Illustrative dimensions are as follows: (1) the stylus-mounted movable electrode = $0.005 \times 0.075$ inches, (2) the carriage-mounted stationary electrode = $0.020 \times 0.100$ inches, and (3) the lateral electrode spacing = $0.003$ inches.

In accordance with one aspect of the present invention, the stylus flylead additionally serves as a movable electrode of the stylus position indicative capacitance.

In the particular embodiment shown in the Christopher application, further field adjustments in the spacing between the stylus-mounted first electrode and the carriage-mounted second electrode might become necessary subsequent to the installation of the pickup cartridge in the carriage compartment because of the fineness of the dimensions involved. Pursuant to a further feature of the subject invention, the second electrode is fixedly disposed in the cartridge housing. The spacing between the flylead and the cartridge-mounted electrode in the apparatus pursuant to the instant invention is factory adjusted, and further field adjustments are not needed.

Figure 3:
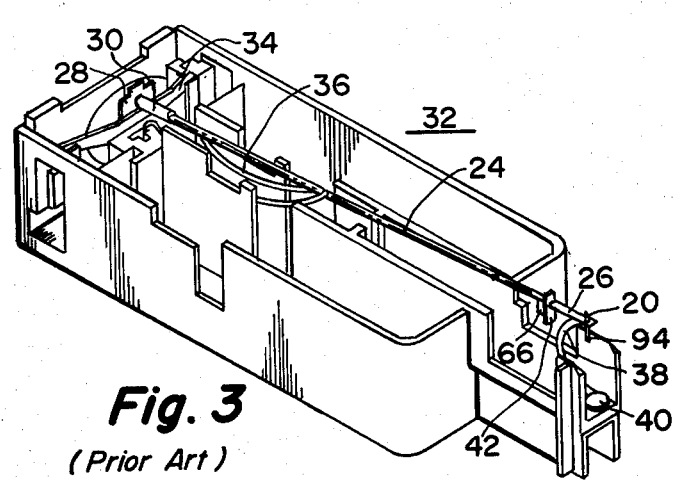
Figure 2:
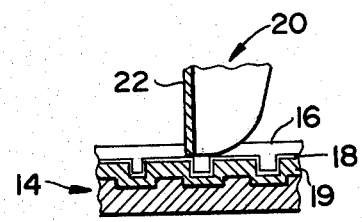
Figure 4:
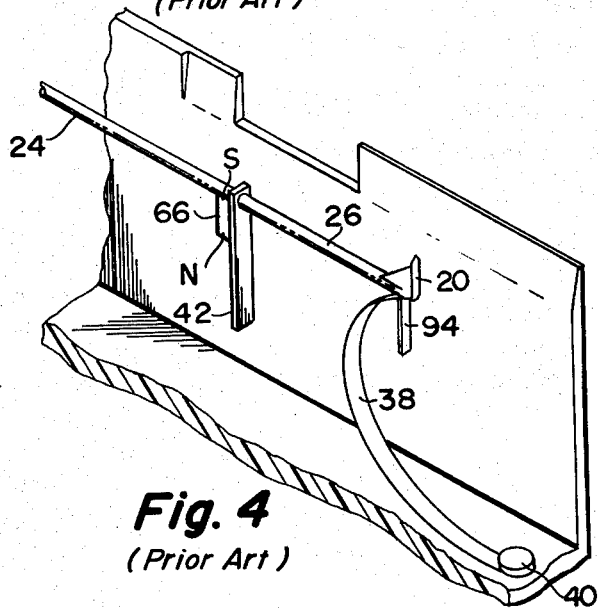
Figure 8:
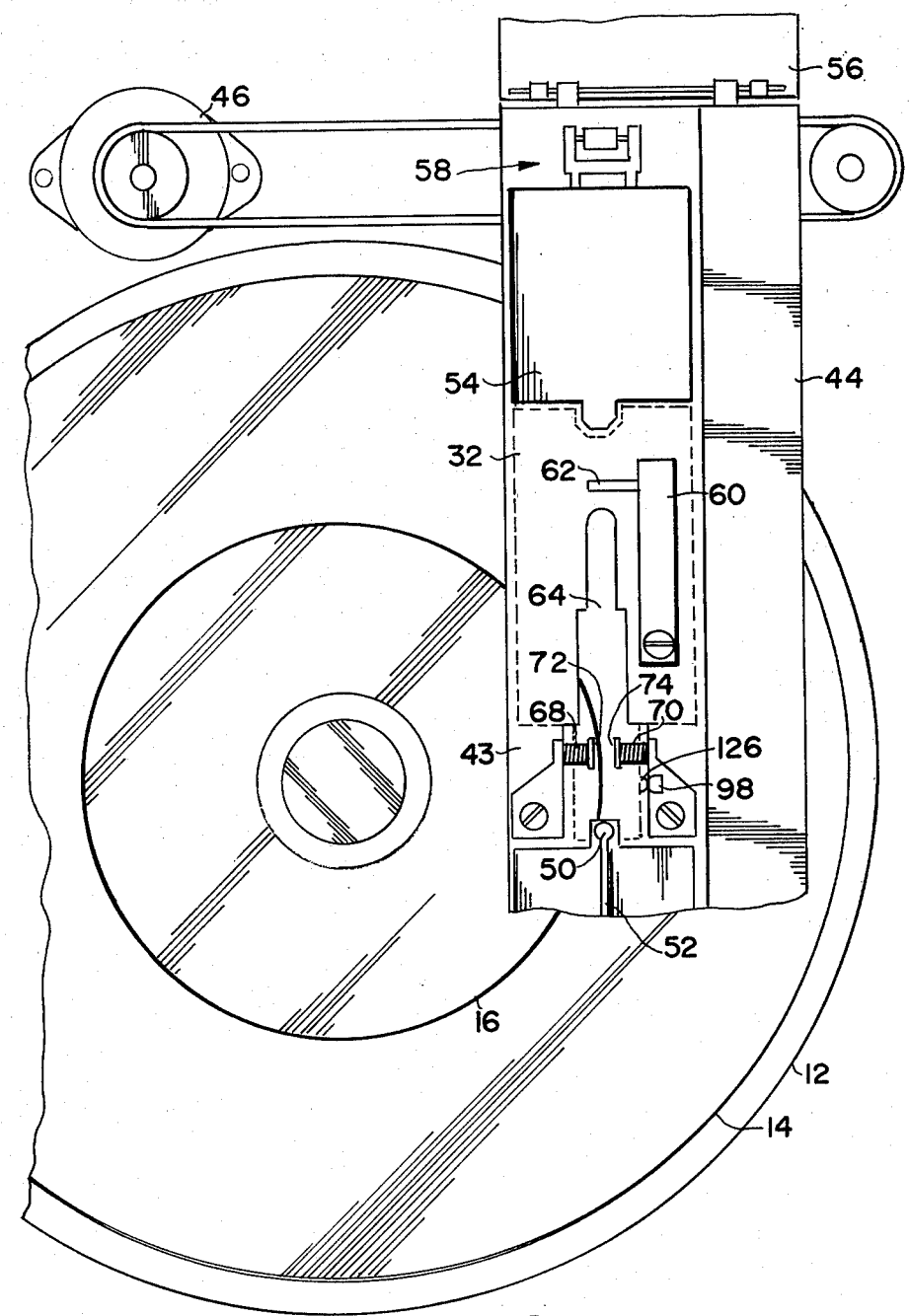
Figure 9:
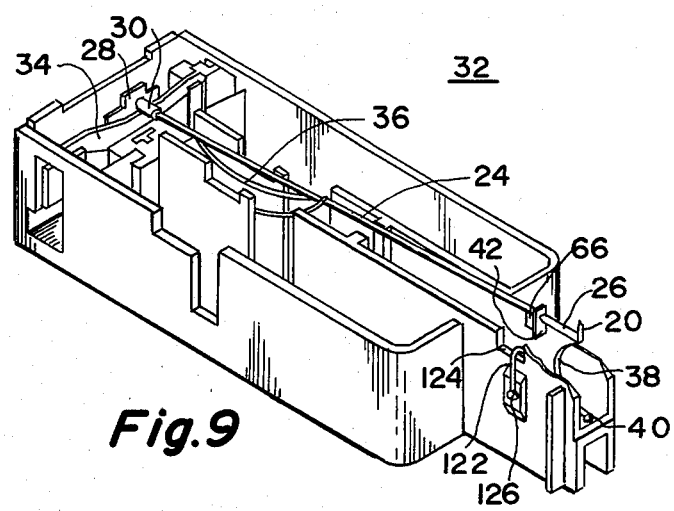
Figure 10:
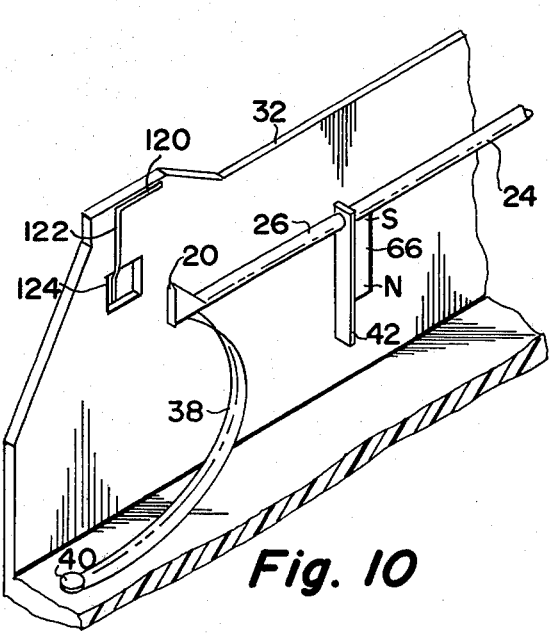

IN THE DRAWINGS:

FIG. 1 is a diagrammatic representation of a capacitance type of video disc player incorporating the stylus position sensing apparatus described in the aforementioned Christopher application;

FIG. 2 schematically illustrates the principles of the capacitance type of signal pickup system;

FIG. 3 presents a perspective view of a pickup cartridge suitable for use with the Christopher stylus position sensing apparatus of FIG. 1, the pickup cartridge being shown upside down to expose its features;

FIG. 4 depicts a perspective view of a portion of the upside-down pickup cartridge of FIG. 3, partially broken away to illustrate the details thereof;

FIG. 5 shown in block diagram form the player electronics including circuitry for the Christopher stylus position sensing apparatus of FIG. 1;

FIGS. 6 and 7 illustrate schematic circuit diagrams for realizing various functions of the stylus position sensing system of FIG. 5; and FIGS. 8-10 show a stylus position sensing apparatus in accordance with the present invention, wherein FIGS. 8-10 respectively correspond to FIGS. 1, 3 and 4.

The stylus position sensing apparatus disclosed in the abovementioned Christopher application will now be described first in conjunction with FIGS. 1-7. FIG. 1 diagrammatically illustrates video disc player 10 having a turntable 12 for rotatably supporting a disc record 14. A motor drives the turntable to rotate at proper speed. U.S. Pat. No. 3,912,283, issued to Hammond, et al., describes an illustrative turntable drive system. Video signals are recorded, as schematically shown in FIG. 2, in the form of undulations in the bottom of a smooth spiral groove 16 disposed on the disc record, the surface of which comprises a thin coating of dielectric material 18 overlying conductive material 19. A pickup stylus 20 incorporates a conductive electrode 22 which forms a signal representative capacitance with the record conductive material when the stylus is lowered on the record for playback. The signal representative capacitance varies in accordance with the signals recorded on the disc as stylus/record relative motion is established. The player employs pickup circuits responsive to the signal representative capacitance variations for reconstructing recorded signals.

The pickup stylus 20 is secured to the free end of a stylus arm 24 by means of a stylus holder 26 in the manner shown in FIGS. 3 and 4. The other end of the stylus arm 24 is secured to a connector plate 28 by means of a compliant coupler 30. The connector plate is suspended in a pickup cartridge 32 by means of a flexible diaphragm 34. A U-shaped spring 36 serves to retain the delicate stylus assembly within the confines of the cartridge body during its storage and handling. A conductive leaf spring 38 (i.e., flylead) connects the pickup electrode 22 to a terminal 40 on the cartridge body. An extension 42 is disposed on the stylus holder for constraining side-to-side excursions of the stylus.

The player includes an arm carriage 44 which is subject to translation along a path disposed radially of the disc record 14 placed on the turntable 12. As shown schematically in FIG. 1, a variable speed, DC motor 46 causes translation of the carriage at an appropriate speed in the manner described subsequently.

The carriage 44 is provided with a compartment 48 for removably receiving the pickup cartridge 32. Placement of the cartridge in the carriage compartment establishes electrical contact between the cartridge terminal 40 and a terminal 50 of a pickup circuit 52. Mounted in the carriage is an armstretcher apparatus 54. When the cartridge is installed in the carriage and a lid 56 of the carriage is closed, a mechanism 58, responsive to the lid movement, pushes the armstretcher toward the cartridge to effect mechanical engagement between the cartridge connector plate 28 and a translatable support disposed on the armstretcher. The armstretcher 54 imparts translatory motion to the stylus in a manner that opposes cylical deviations in the stylus/record relative velocity during playback. The cyclical deviations in the stylus/record relative velocity result from a number of sources, for example, eccentricity, warp, etc. U.S. Pat. No. 3,983,318 (Miller) describes an illustrative armstretcher apparatus.

Also disposed in the carriage is a stylus arm lifting/lowering apparatus 60. The lifting/lowering apparatus serves (1) to gently lower the pickup stylus on the record for playback, (2) to lift the stylus away from the record in the pause mode of the player, and (3) to raise the stylus for allowing it to clear the record bead as the carriage moves from an off-record rest position to an on-record play position. When the lid 56 is closed, a tab disposed thereon defeats the stylus arm retaining spring 36, permitting the stylus arm 24 to rest on a support member 62 of the lifting/lowering apparatus. The bottom wall of the carriage has an opening 64 through which the pickup stylus is lowered for playback. Reference may be made to U.S. Pat. No. 4,053,161 (Bleazey) for a more detailed description of the stylus arm lifting/lowering apparatus.

The Simshauser track skipper apparatus (U.S. patent application, Ser. No. 039358) comprises a small, lightweight permanent magnet 66 secured on the back side of the extension 42, and a pair of large diameter, air-core coils 68 and 70 disposed about plastic bumpers 72 and 74 mounted in the carriage. It will be noted that the bumpers 72 and 74 limit the side-to-side excursions of the extension 42 disposed on the stylus arm. The skipper coils are connected such that upon energization, they generate aiding magnetic fields. The permanent magnet is so dimensioned that its north pole is interposed between the coils when the stylus is lowered for playback. The stylus arm is displaced inward or outward depending upon the polarity of the actuating pulse applied to the coils. As previously indicated, the track skipper apparatus serves a multitude of functions, such as locked groove clearance, special effects, active searches, etc.

FIG. 5 is a block diagram representation of player electronics including circuitry for the stylus position sensing apparatus. The circuitry employed to recover the signals recorded on the disc will be explained first. As shown in FIG. 5, the terminal 50 of the pickup circuit 52 is coupled to the conductive stylus electrode 22. The pickup circuit, responsive to the variations in the signal representative capacitance 53 formed between the stylus electrode 22 and the conductive material of the record 14, provides at the output terminal 76 thereof audio and video signals recorded on the disc. Reference may be made to U.S. patents issued to Carlson, et al. (U.S. Pat. No. 3,872,240) and Kawamoto, et al. (U.S. Pat. No. 4,080,625) for descriptions of illustrative pickup circuits. The output of the pickup circuit 52 is delivered to a pair of bandpass filters 78 and 80. The picture carrier bandpass filter 78 has a relatively wide passband encompassing the deviation range of the high frequency picture carrier (e.g., 4.3 to 6.3 MHz) as well as the requisite adjacent sideband regions, and selectively passes the picture carrier component of the recorded signal to the relative exclusion of the sound carrier component thereof. The sound carrier bandpass filter 80 has a relatively narrow passband encompassing the deviation range of the low frequency sound carrier (e.g., 716 KHz±55 KHz) as well as the requisite adjacent sideband regions, and selectively passes the sound carrier component of the recorded signal to the relative exclusion of the picture carrier component thereof.

The outputs of the respective bandpass filters 78 and 80 are passed to respective demodulators 82 and 84. The picture demodulator 82 develops at its output terminal the picture signal information inclusive of synchronizing components, and the sound demodulator 84 develops at its output terminal the audio signal information.

A picture signal processor 86, coupled to the picture demodulator, effects the separation of the chrominance information from the luminance information. A composite video signal generator 88 recombines the chrominance and the luminance information in accordance with, for example, the NTSC format. A transmitter circuit 90 processes the sound, luminance and the chrominance information to form a signal suitable for delivery to a conventional color TV receiver, wherein color image displays may be developed in accordance with the recorded information. U.S. Pat. No. 4,097,899, issued to J. P. Yu, describes an illustrative transmitter circuit.

The player electronics also includes circuits coupled to the output of the signal pickup for detecting the occurrence of the locked grooves on the record. An illustrative locked groove detection scheme is described in U.S. patent application Ser. No. 908,516, filed on May 22, 1978 in the name of Palmer, now U.S. Pat. No. 4,198,658. The locked groove correction signal is applied to the coils 68 and 70 to effect locked groove clearance.

The stylus position sensing apparatus disclosed in the Christopher application includes a stylus position indicative capacitance 92 established between a first electrode 94 secured in a fixed relation to the stylus arm 24 and electrically connected to the flylead 38, and a second electrode 96 coupled to a terminal 98 disposed on the arm carriage 44 in the vicinity of the first electrode as shown in FIG. 5. Illustratively, the first electrode is 0.005 inches by 0.075 inches and the second electrode is 0.020 inches by 0.100 inches. The stylus position indicative capacitance 92 is arranged in series with a varactor diode 100. The varactor diode 100 is coupled to the output terminal 104 of a 260 KHz. reference oscillator 102 by means of a resistor 106. The stylus position indicative capacitance 92 is modulated by the spacing between the stylus 20 and the carriage 44, and the capacitance of the varactor diode 100 is modulated by the reference oscillator 102. A schematic circuit diagram suitable for generating the 260 KHz. reference carrier is shown in FIG. 6 and the values of various elements shown therein are presented hereinbelow in a table.

The signal pickup circuit 52 additionally serves to sense the variations in the capacitance formed by the stylus position indicative capacitance 92 and the capacitance of the varactor diode 100 disposed in series therewith, which variations appear at the output terminal 76 thereof as a 260 KHz. signal having an amplitude which varies inversely with the spacing between the position sensing electrodes 94 and 96. This signal is separated from the rest of the signals appearing at the output terminal 76 of the pickup circuit by a bandpass filter 108 coupled thereto. The bandpass filter has a passband encompassing the requisite deivation range of the 260 KHz. reference carrier. The separated 260 KHz. signals are amplified by an amplifier 110. A peak detector 112, coupled to the amplifier 110, generates a signal at the output thereof which represents the relative position of the pickup stylus 20 with respect to the arm carriage 44. The peak detector output signal is supplied to the driver amplifier 114 which generates at the output terminal 116 thereof an error correction signal suitable for application to the motor 46, which drives the carriage. The amplitude of the signal applied to the carriage motor is such that the spacing between the stylus and the carriage is maintained at a predetermined optimum level. A schematic circuit suitable for realizing the foregoing functions is illustrated in FIG. 7, and the values of various elements shown therein are also given in the attached table.

As previously indicated, it is desirable to eliminate field adjustments of the stylus position sensing capacitance. The instant stylus position representative capacitance not only makes field adjustments unnecessary, but it also eliminates the need for a separate stylus-mounted electrode. An apparatus pursuant to this invention will now be described with reference to FIGS. 8–10, which correspond to previously-described FIGS. 1, 3 and 4. As can be seen from FIG. 10, an electrode 120 of the subject apparatus is fixedly disposed on the cartridge 32. A wire 122, threaded through an aperture 124 in the wall of the cartridge housing, electrically connects the cartridge-mounted electrode 120 to a terminal 126 provided on the cartridge housing in the manner indicated in FIGS. 9 and 10. The cartridge terminal 126 electrically engages the terminal 98 upon receipt of the cartridge in the carriage compartment as illustrated in FIG. 8.

Pursuant to a further aspect of the present invention, the stylus flylead 38, which serves to provide electrical connection between the stylus pickup electrode 22 and the pickup circuits 52 of the player, additionally serves as a second electrode of the instant stylus position representative capacitance when the stylus arm is lowered on the record for playback.

It is noted that although the instant stylus position sensing apparatus is utilized herein for varying the rate of translation of the arm carriage in the manner that maintains a desired spacing between the pickup stylus and the arm carriage, it is also suitable for other purposes, such as detection of locked grooves on the disc. Moreover, it is important to understand that while the description herein is in the context of grooved discs, it is equally applicable to flat discs. Various defects on flat discs can cause the pickup stylus to retrace the same track. The present system can be advantageously employed to clear such occurrences in the playback of flat discs.

TABLE OF VALUES

Illustratively, the values of various elements utilized in FIGS. 5–7 are specified below.
I. CAPACITORS:
  (1) C1—0.01 microfarad
  (2) C2—1,000 picofarad
  (3) C3—1.0 microfarad
  (4) C4—220 picofarad
  (5) C5—0.01 microfarad
  (6) C6—2.2 microfarad
  (7) C7—10.0 microfarad
II. RESISTORS:
  (1) R1—10.0 Kilohms
  (2) R2—10.0 Kilohms
  (3) R3—7.5 Kilohms
  (4) R4—100.0 Kilohms
  (5) R5—13.0 Kilohms
  (6) R6—4.7 Kilohms
  (7) R7—3.0 Kilohms
  (8) R8—39.0 Kilohms
  (9) R9—2.0 Kilohms
  (10) R10—4.3 Kilohms
  (11) R11—82.0 Ohms

(12) R12—4.7 Kilohms
(13) R13—10.0 Kilohms
(14) R14—10.0 Kilohms
(15) R15—62.0 Ohms
(16) R16—510.0 Ohms
(17) R17—7.5 Kilohms
(18) R18—1.0 Kilohms
(19) R19—5.0 Kilohms
(20) R20—10.0 Kilohms

III. DIODES:
 (1) VD1—1477949—1
 (2) D2-3—IN60
 (3) D4-5—IN914

IV. TRANSISTORS:
(1) Q1—1417330-3
(2) Q2-5—MPSA17
(3) Q6—MPSU05

V. MISCELLANEOUS:
 (1) CF1—260 KHz. Ceramic resonator
 (2) CF2—260 KHz. Ceramic filter

What is claimed is:

1. A system for recovering prerecorded signals during playback from a disc record having information recorded thereon along a spiral track disposed on the surface thereof by means of a track-following stylus incorporating a pickup electrode; said record having a conductive property; said stylus being disposed at one end of a stylus arm; a compliant member securing the other end of said stylus arm to a pickup cartridge; a planar, conductive flylead having one end attached to said stylus pickup electrode, and having its other end secured to a first terminal disposed on said cartridge such that a narrow edge of said flylead is arranged in a plane disposed substantially perpendicularly to the plane of said record during playback; said system including a carriage subject to translation along a path disposed radially of said disc record; a first means housed in said carriage for sensing a signal indicative capacitance formed between said pickup electrode and said conductive property of said record for providing said prerecorded signals at an output terminal thereof; said first means having an input terminal; said carriage having a compartment for removably receiving said pickup cartridge; said first cartridge terminal being subject to engagement with said input terminal of said first means upon reception of said cartridge in said carriage compartment; a second means housed in said carriage and modulated at a given frequency rate; a conductive element coupled to said given frequency modulated means, and fixedly mounted in said carriage such that said conductive element is juxtaposed to said narrow edge of said stylus-mounted flylead when said stylus is disposed in a playback relationship with respect to said record; said narrow edge of said stylus-mounted conductive flylead and said fixedly-mounted conductive element defining a stylus position indicative capacitance; said first means, coupled to said flylead, additionally serving to sense said stylus position indicative capacitance modulated at said given frequency rate for generating a stylus position representative signal at said output terminal of said first means.

2. In a system for recovering prerecorded signals during playback from a disc record having information recorded thereon along a spiral track disposed on the surface thereof by means of a track-following stylus incorporating a pickup electrode; said record having a conductive property; said stylus being disposed at one end of a stylus arm; a compliant member securing the other end of said stylus arm to a pickup cartridge; a conductive flylead having one end attached to said stylus pickup electrode, and having its other end secured to a first terminal disposed on said cartridge; said system including a carriage subject to translation along a path disposed radially of said disc record; a first means housed in said carriage for sensing a signal indicative capacitance formed between said pickup electrode and said conductive property of said record for providing said prerecorded signals at an output terminal thereof; said first means having an input terminal; said carriage having a compartment for removably receiving said pickup cartridge; said first cartridge terminal being subject to engagement with said input terminal of said first means upon reception of said cartridge in said carriage compartment; a second means housed in said carriage and modulated at a given frequency rate; said given frequency modulated means having an output terminal; an improvement comprising:

(A) a conductive element fixedly mounted to said cartridge such that said conductive element confronts said stylus-mounted flylead when said stylus is disposed in a playback relationship with respect to said record; said stylus-mounted conductive flylead and said cartridge-mounted conductive element defining a stylus position indicative capacitance; and (B) a second terminal disposed on said cartridge and coupled to said conductive element; said second cartridge terminal being subject to engagement with said output terminal of said given frequency modulated means during containment of said cartridge in said carriage compartment;

said first means, coupled to said flylead, additionally serving to sense said stylus position indicative capacitance modulated at said given frequency rate for generating a stylus position representative signal at said output terminal of said first means.

* * * * *